Mar. 20, 1923.
C. B. D. WOOD
CONVEYER FLIGHT OR BLADE AND METHOD OF MAKING THE SAME
Filed May 13, 1921   3 sheets-sheet 1
1,449,208
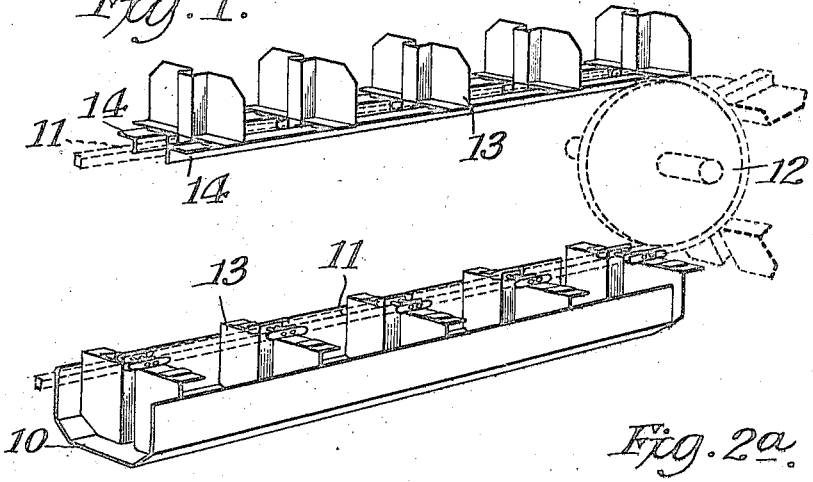
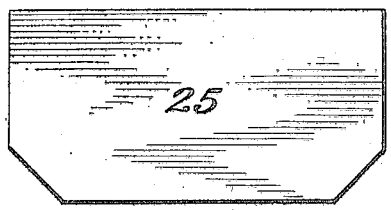
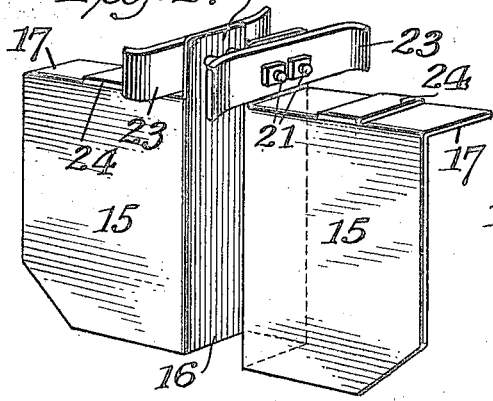
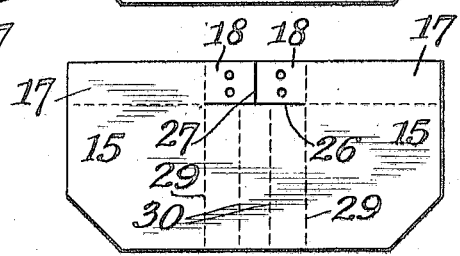
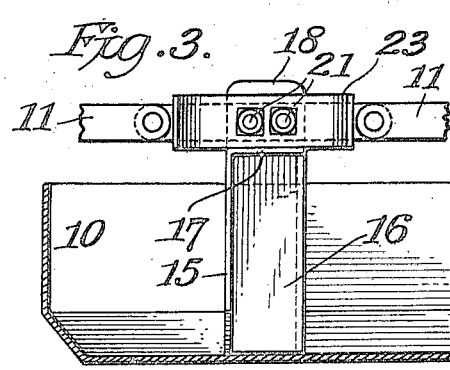
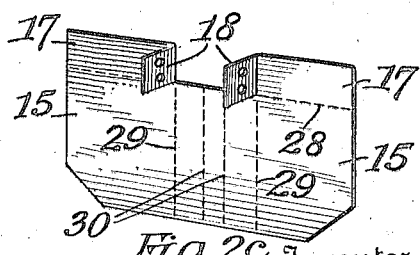

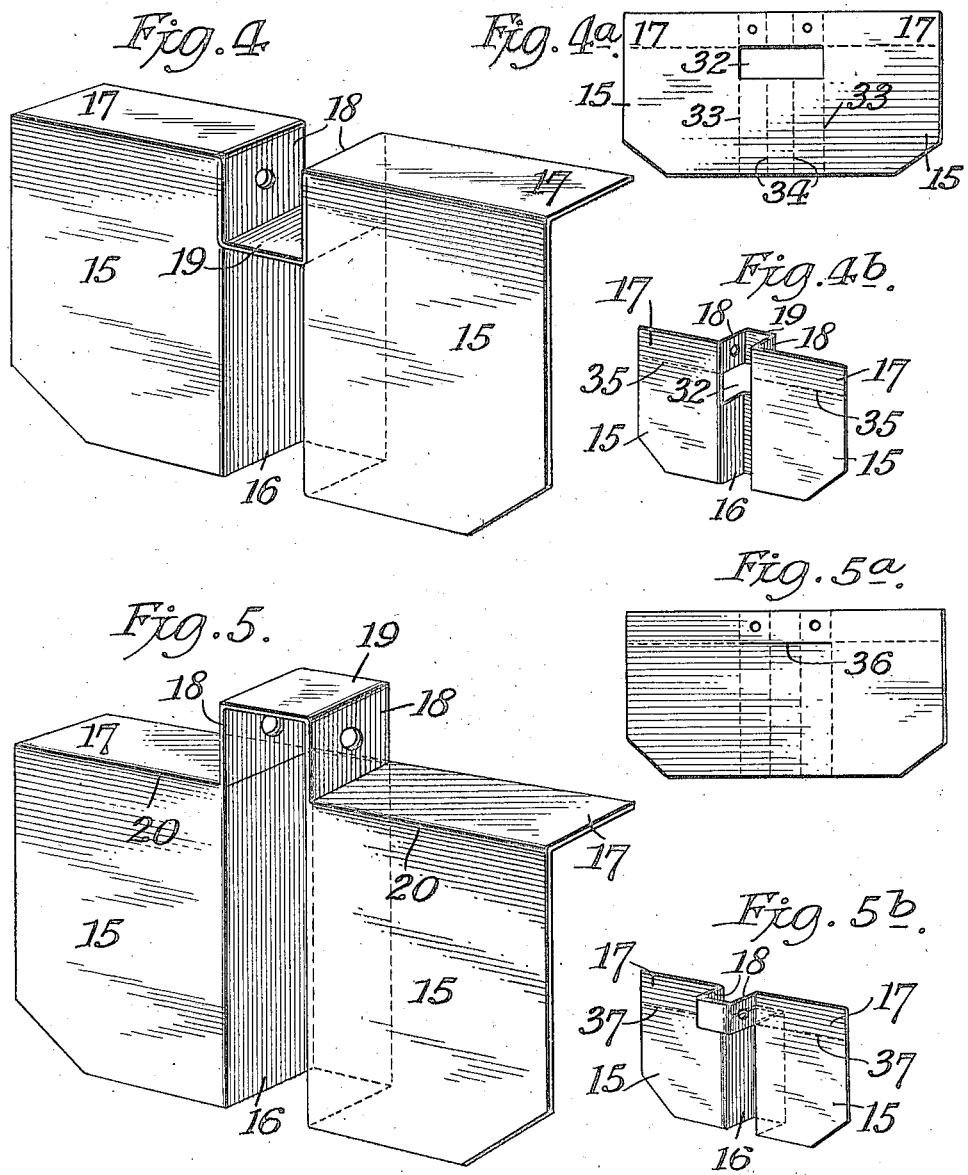

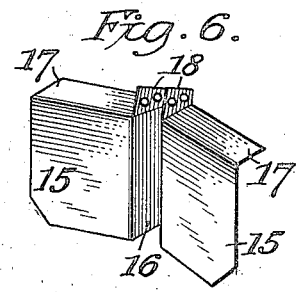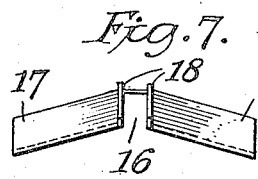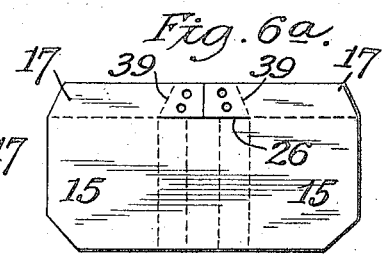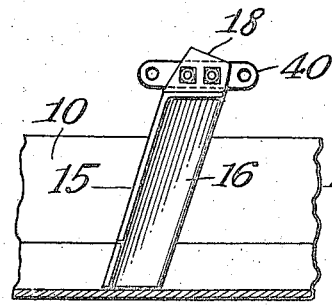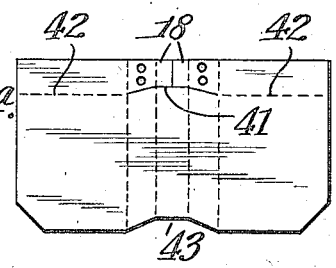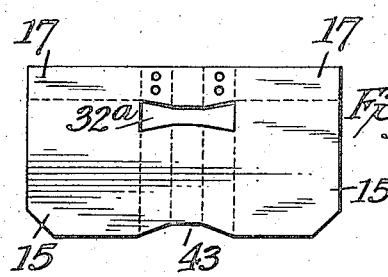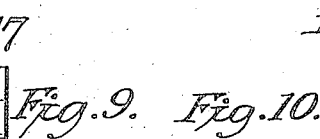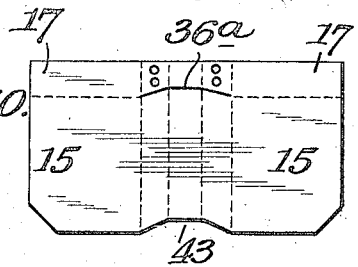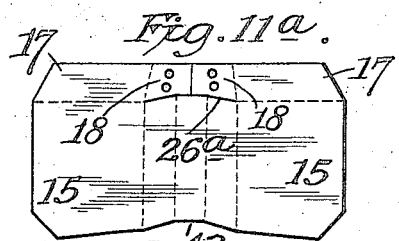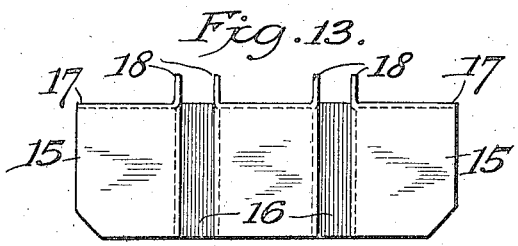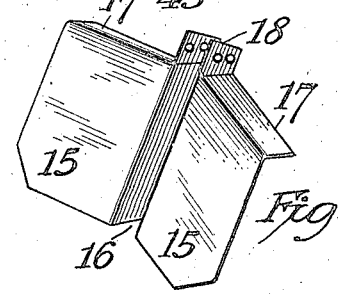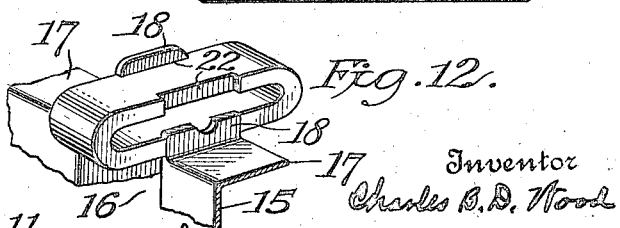

Patented Mar. 20, 1923.

1,449,208

UNITED STATES PATENT OFFICE.

CHARLES B. D. WOOD, OF WILKES-BARRE, PENNSYLVANIA.

CONVEYER FLIGHT OR BLADE AND METHOD OF MAKING THE SAME.

Application filed May 13, 1921. Serial No. 469,172.

*To all whom it may concern:*

Be it known that I, CHARLES B. D. WOOD, a citizen of the United States of America, residing at Wilkes-Barre, in the county of Luzerne and State of Pennsylvania, have invented certain new and useful Improvements in Conveyer Flights or Blades and Methods of Making the Same, of which the following is a full, clear, and exact description.

This invention relates to scraper-blades or "flights" for trough conveyers designed for transporting coal, gravel, sand, and other divided or loose material, and its chief object is to provide a one-piece sheet metal blade or flight which can be produced and installed at low cost. Another object is to provide a blade of the type indicated which can be used with conveyers now in use. To these and other ends the invention consists in the novel features and combinations hereinafter described.

Several embodiments of the invention are illustrated in the accompanying drawings, in which—

Fig. 1 is a perspective view illustrating somewhat diagrammatically a conveyer in which the present embodiments of my invention may be used.

Fig. 2 is a perspective view of a simple form of the invention, showing also the clamping plates which may be used in some cases.

Figs. 2ª and 2ᵇ are plan views and Fig. 2ᶜ a perspective view, illustrating three stages of a simple and effective method of making the flight shown in Fig. 2.

Fig. 3 is a side view of the flight illustrated in Fig. 2, showing it in use in a trough and mounted on a chain.

Fig. 4 is a perspective view of another embodiment.

Fig. 4ª is a plan view and Fig. 4ᵇ a perspective view illustrating two stages in a simple and convenient method of making the flight or blade shown in Fig. 4.

Fig. 5 is a perspective view of another form of the invention.

Fig. 5ª is a plan view and Fig. 5ᵇ a perspective view illustrating two stages in a simple and convenient method of making the flight shown in Fig. 5.

Fig. 6 is a perspective view of still another form, similar to Fig. 2 but with the blade or flight dished so as to scoop the material toward the center of the blade or flight as it travels through the conveyer trough.

Fig. 6ª is a plan view illustrating a stage in a simple and convenient method of making the dished flight shown in Fig. 6.

Fig. 7 is a plan view of the flight shown in Fig. 6.

Fig. 8 is a side view of still another form, similar to Fig. 2 but inclined forwardly relatively to the trough.

Fig. 8ª is a plan view illustrating a stage in a simple and convenient method of making the flight or blade shown in Fig. 8.

Figs. 9 and 10 are plan views illustrating stages in the making of flights of the types shown in Figs. 4 and 5 but with a forward rake or incline such as illustrated in Fig. 8.

Fig. 11 is a perspective view showing a flight or blade similar to that shown in Fig. 2 but combining the dished form of Fig. 6 and the forward rake or slant of Fig. 8.

Fig. 11ª is a plan view illustrating a stage in a simple and convenient method of making the blade shown in Fig. 11.

Fig. 12 is a detail perspective view showing one method of mounting my improved flight on the chain of the conveyer.

Fig. 13 is a front view of a flight similar to that illustrated in Fig. 2 but with provision for attachment to a two-chain conveyer.

Fig. 1 is intended to illustrate in a broad and general manner the type of conveyer to which my present improvement relates. As shown it comprises a trough 10 of any suitable cross-sectional form, and a chain 11 traveling along the trough (in or above the same) and running over sprocket wheels of which one is indicated by the dotted lines at 12. The chain is equipped with scraping blades or flights 13, spaced a suitable distance apart, which, as the chain travels, move through the trough, push ahead of them, and thus transport, the material deposited in the trough. In the upper or return reach of the chain the flights may travel on supporting rails 14, arranged a suitable distance from the trough and usually parallel thereto. It will of course be understood that one or both of the sprockets is power driven.

In conveyers of this type the flights or scraper-blades suffer rapid wear, especially when handling hard gritty material, as for example coal, especially in the case of anthracite, and as a result, replacements are numerous, some anthracite producers using upwards of forty thousand flights per year, which adds very materially to the cost of handling coal. It is therefore highly desirable to find a flight which is not only sufficiently strong to do the work required but which can be made at low cost, thereby cutting down the upkeep cost of the conveyers. I have been led to devise my present invention, which has for its chief object the production of a sheet-metal flight that can be made by a stamping, binding or die-pressing, and can in most cases if not all be attached to the chain without the use of separate brackets or other special attaching devices. In this way a very substantial saving in labor and material is effected, not only in making the blades but also in mounting them for use.

My improved flight comprises, generally, a member composed of sheet metal, preferably steel, of suitable gauge, which may vary in thickness from, say, one-eighth of an inch for a twelve-inch blade to a half-inch thick for a fifty-four inch blade. The flights illustrated comprise two wings, 15, integral at their inner upright edges with a channel 16 (preferably open toward the front, as shown) which serves the important purpose of stiffening the blade and by the additional strength and rigidity thus obtained permitting the use of thinner or lighter material. At the upper edge the wings are provided with flanges 17, preferably though not necessarily turned rearwardly, and preferably though not necessarily arranged at right angles to the blade. Above the channel the flanges are bent to form two ears 18, providing a socket to receive the link (of the conveyer chain) on which the flight is to be mounted. In the flights shown in Figs. 2, 3, 4, 6, 8 and 11, the socket is open at the top, and this is the form preferred since it can be attached to the chain without disconnecting the links, which is inconvenient in some types of chains. The socket may, however, be closed at the top by an integral web 19, as in Fig. 5 for example, designed for chains in which each link can be readily detached from its neighbors. The flanges 17 serve the purpose of stiffening the blade against operating pressures tending to bend the wings backward, and in all cases it is preferable to have the sides of the channel 16 underlie the ears 18, to strengthen the blade against bending at the edge 20 where the wings and flanges join. The back of the channel is preferably high enough to permit the link to rest on its upper edge, thus aiding in holding the blade at the proper angle to the chain.

The blade is fastened to the chain by means of the ears 18, which are provided with suitably located holes to receive the necessary fastening devices, as bolts 21. I prefer to use two bolts, but in many cases one is sufficient, especially where the link is provided with lateral recesses, as 22, Fig. 12, to receive the ears and aid in holding the blade at the right angle. With long links it may be desirable to use longitudinal spacing plates as 23, Figs. 2 and 3, inside or outside of the ears 18.

In the return reach of the conveyer the flights or blades slide on wood or metal supporting rails, as the angle irons 14, Fig. 4. If these rails are of metal, the flanges 17 would suffer rapid wear. To take the wear they may be provided with wear-blocks or plates, as 24, Fig. 2, riveted or welded or otherwise secured in place and preferably composed of manganese steel, which has good wear-resisting properties.

In making a flight or blade such as is shown in Fig. 2, I first prepare a flat blank 25, Fig. 2$^a$, of sheet metal, the lower edge of which is shaped to fit to the cross-sectional contour of the trough with which the flight is to be used. Thus for a trough of the shape indicated in Fig. 3, the lower corners of the rectangular blank are cut off, as indicated in Figs. 2$^a$, 2$^b$, 2$^c$. The blank is then slotted centrally along a line parallel to its upper edge, as at 26, Fig. 2$^b$, at a suitable distance from such edge according to the width desired for the flanges 17. A transverse slot 27 is also cut from the center of slit 26 to the upper edge of the blank, thus providing two tongues which may be bent up later to form the ears 18, as in Fig. 2$^c$. The flanges are formed by bending the upper portion backwardly along the dotted lines 28, and the channel 16 is formed by bending the body of the blank along the dotted lines 29, 30.

In the flight or blade illustrated in Fig. 4 the ears 18 extend downwardly from the flanges 17 and at the bottom are connected by the integral web 19. To make a flight of this form the blank, Fig. 4$^a$, is provided with a wide slot 32. The blank is then bent along the vertical dotted lines 33, 34, to produce the channel 16, ears 18 and web 19, as in Fig. 4$^b$, after which the upper portion is bent backward along the lines 35, thus producing the flanges 17 and turning the ears downward to form the upwardly open socket shown in Fig. 4. Preferably the height of the opening 32, Fig. 4$^a$, is such that when the bend is made along the lines 35 the web 19 will be brought down upon the sides, at least, of the channel. Preferably, also, the lines 33, along which the blank is bent to form the forward edges of the channel, substantially coincide with the ends of the slot 32, so that when the bends are made and the ears 18 turned down the channel will be completely closed at the top. It will be understood that in such case the depth and width of the channel are determined by the dimensions of the opening 32, or vice versa.

Since the bends along the lines 33 are rearward above as well as below the opening 32 they are conveniently made simultaneously by the same plunger or other member of the die.

In making the flight illustrated in Fig. 5 the blank shown in Fig. 5ᵃ is provided with a longitudinal slot 36, similar to the slit 26, Fig. 2ᵃ, after which it is bent above the slot to form the ears 18 and web 19, and rearwardly to form the channel 16, as in Fig. 5ᵇ. A rearward bend along the lines 37 forms the flanges 17, Fig. 5, and turns the ears 18 up, with their lower edges bearing upon the sides of the channel.

In the flights so far described the front of the blade is flat, that is, both wings are in the same plane. In some cases, however, it is desirable to have the flight dished in front, that is, to have the wings not in the same plane but extending at an angle less than 180°, as in Figs. 6 and 7, so that the wings will scoop the material toward the center line of the trough and thus lessen the liability of the material spilling over the sides, especially when the conveyer is operating at its maximum capacity. In making a flight of the dished type the ears 18 are bent up on lines at an angle to each other, as for example the lines 39, Fig. 6ᵃ. It will be understood that like modification can be made in the case of the blanks shown in Figs. 2ᵇ, 4ᵃ, and 5ᵃ.

The flight shown in Fig. 8 has a forward cant or slant, which may be desirable in some cases. To make a flight of this type, and still keep the flanges 17 parallel to the chain (represented by the link 40), the slot 41 in the blank shown in Fig. 8ᵃ has its central portion parallel to the upper edge of the blank, to form the straight upper edge of the channel in the body of the flight, but the end portions of the slot are inclined, as indicated. Then when the upper portion of the blank is bent back along lines 42 to form the flanges 17, the bottom edges of the ears 18 will come down upon the upper side-edges of the channel. To keep the bottom edges of the channel in the plane of the bottom edges of the wings 15, the lower edge of the blank is recessed as indicated at 43.

If a forward slant is desired in a flight of the type illustrated in Fig. 4, the slot 32 in the blank (Fig. 4ᵃ), or at least the lower edge of the slot, is modified as indicated at 32ᵃ, Fig. 9, and the lower edge of the blank is recessed as indicated at 43. To give a cant to a flight of the type shown in Fig. 5, the slot 36, Fig. 5ᵃ, is shaped as indicated at 36ᵃ, Fig. 10, and the recess 43 is cut in the lower edge of the blank.

It may be desirable for some purposes to have a dished flight with a forward slant, as in Fig. 11, for example, which shows a flight of the kind illustrated in Fig. 2 but having the features just mentioned. In such case the slot 26, Fig. 2ᵇ, is shaped as indicated at 26ᵃ, Fig. 11ᵃ, and the ears 18 are bent up along upwardly converging instead of parallel lines so as to bring the ears to parallelism when the flanges 17 are bent back. A recess 43 is cut in the bottom of the blank and the adjoining edges of the wings are given an upward and inward inclination, so that the bottom edges of the wings and channel will lie in the same plane when the bends are made along the vertical dotted lines in Fig. 11ᵃ to form the channel and give the wings the desired inward inclination, as in Fig. 11. By similar modification of the blanks shown in Figs. 4ᵃ and 5ᵃ, dished and canted flights otherwise like those illustrated in Figs. 4 and 5, respectively, can be produced.

In the forms so far described one pair of ears (18) and one channel (16) are shown, the flights being intended for what are known as single-chain conveyers, but it will be understood that additional ears and an additional channel may be provided if the flight is to be used on a two-chain conveyer. Thus in Fig. 13, there are two channels and two pairs of ears. Similar modifications may of course be made in the flights shown in Figs. 4, 5, 6, 8 and 11.

The slotting and cutting operations described herein can be performed by sawing, slitting or stamping, and the bending operations can be performed by die-pressing, thus reducing the labor-cost of the flight to a relatively small part of the total cost.

It is to be understood that the invention is not limited to the specific forms and procedures herein set forth, since these can be modified in various ways without departure from the spirit of the invention as defined by the following claims.

I claim:

1. A conveyer flight or blade composed of sheet metal, comprising a plate bent along vertical lines to form a strengthening channel, the upper edge-portion of the plate being bent to form strengthening flanges and also bent to form laterally spaced ears for attachment to a conveyer chain.

2. A conveyer flight or blade composed of sheet metal, comprising a plate bent rearwardly along vertical lines to form a rearwardly closed strengthening channel, said plate having its upper edge-portion bent rearwardly to form strengthening flanges and the intermediate part of said edge portion being bent to form laterally spaced vertical ears for attachment to a conveyer chain.

3. A conveyer flight or blade composed of sheet metal, comprising a plate bent along vertical lines to form a strengthening channel and having its upper edge-portion bent to form strengthening flanges, the intermediate part of said edge-portion being bent upwardly to form laterally spaced ears for attachment to a conveyer chain, the ears overhanging the sides of the channel to strengthen the blade against bending under rearwardly exerted stresses.

4. A conveyer flight or blade composed of sheet metal, comprising a blade bent rearwardly along vertical lines to form a rearwardly closed strengthening channel, the upper-edge-portions of the blade extending laterally from said channel being bent rearwardly to form strengthening flanges and the inner portions of the flanges being bent upwardly to form laterally spaced ears providing an upwardly open socket for attachment to a conveyer chain.

5. In the art of making conveyer flights or blades, the improvement comprising cutting a flat blank of sheet metal, slotting the blank adjacent to the upper edge thereof, bending the blank below the slot to form a vertical strengthening channel in the body of the blank, bending along the line of the slot the edge-portion of the blank to form strengthening flanges, and bending the intermediate part of the said edge-portion to form laterally spaced vertical ears.

6. In the art of making conveyer flights or blades, the improvement comprising cutting a flat blank of sheet metal, slotting the blank longitudinally adjacent to the upper edge and transversely from the upper edge to the longitudinal slot to form a pair of inwardly extending tongues, bending the blank below the longitudinal slot to form a vertical strengthening channel, bending the blank above the longitudinal slot to form strengthening flanges along the top of the flight, and bending said tongues upwardly to form laterally spaced vertical ears for attachment to a conveyer chain.

In testimony whereof I hereto affix my signature.

CHARLES B. D. WOOD.